United States Patent [19]

Whitnah

[11] 4,301,662
[45] Nov. 24, 1981

[54] VAPOR-JET HEAT PUMP

[75] Inventor: Gordon R. Whitnah, Minneapolis, Minn.

[73] Assignee: Environ Electronic Laboratories, Inc., Minneapolis, Minn.

[21] Appl. No.: 110,181

[22] Filed: Jan. 7, 1980

[51] Int. Cl.³ .......................... F25B 27/02; F25B 1/06
[52] U.S. Cl. ................................. 62/238.4; 62/238.1; 62/500; 237/1 R; 237/2 B
[58] Field of Search ................... 62/238.4 C, 238.6 E, 62/238.1 R, 500; 237/2 B, 19, 1 R

[56] References Cited

U.S. PATENT DOCUMENTS

| | | | |
|---|---|---|---|
| 2,104,847 | 1/1938 | Brace et al. | 62/500 X |
| 2,353,966 | 7/1944 | Newcombe | 62/238 C |
| 3,500,897 | 3/1970 | Cube | 62/238 C |
| 3,922,877 | 12/1975 | Ophir et al. | 62/238 C |
| 4,007,776 | 2/1977 | Alkasab | 62/500 |
| 4,164,850 | 8/1979 | Lowi, Jr. | 62/238 C |
| 4,213,305 | 7/1980 | DeGeus | 62/500 X |

*Primary Examiner*—Lloyd L. King

*Attorney, Agent, or Firm*—Orrin M. Haugen; Thomas J. Nikolai

[57] ABSTRACT

A heat pump for use in heating residential, commercial or industrial buildings, industrial and agricultural processes and heating of water to moderate temperatures such as may be required in swimming pools or as a water pre-heater for any other use. The system includes a fuel consuming refrigerant boiler for producing a refrigerant in vaporized form at relatively high pressure, the output of the boiler being connected to a superheater and then to the primary jet of an ejector-type compressor. An evaporator unit exposed to ambient temperatures has its output line connected to an inlet of the ejector such that as the high pressure gaseous refrigerant flows through the nozzle of the ejector, a low pressure is created and the refrigerant from the evaporator is also caused to flow through the ejector compressor to a condenser where the refrigerant is allowed to give up its heat. The condenser is coupled in circuit with a receiver which holds liquid refrigerant and delivers same to the boiler and evaporator, all under control of fluid level or pressure sensitive switches governing the operation of a liquid refrigerant pumping means.

5 Claims, 1 Drawing Figure

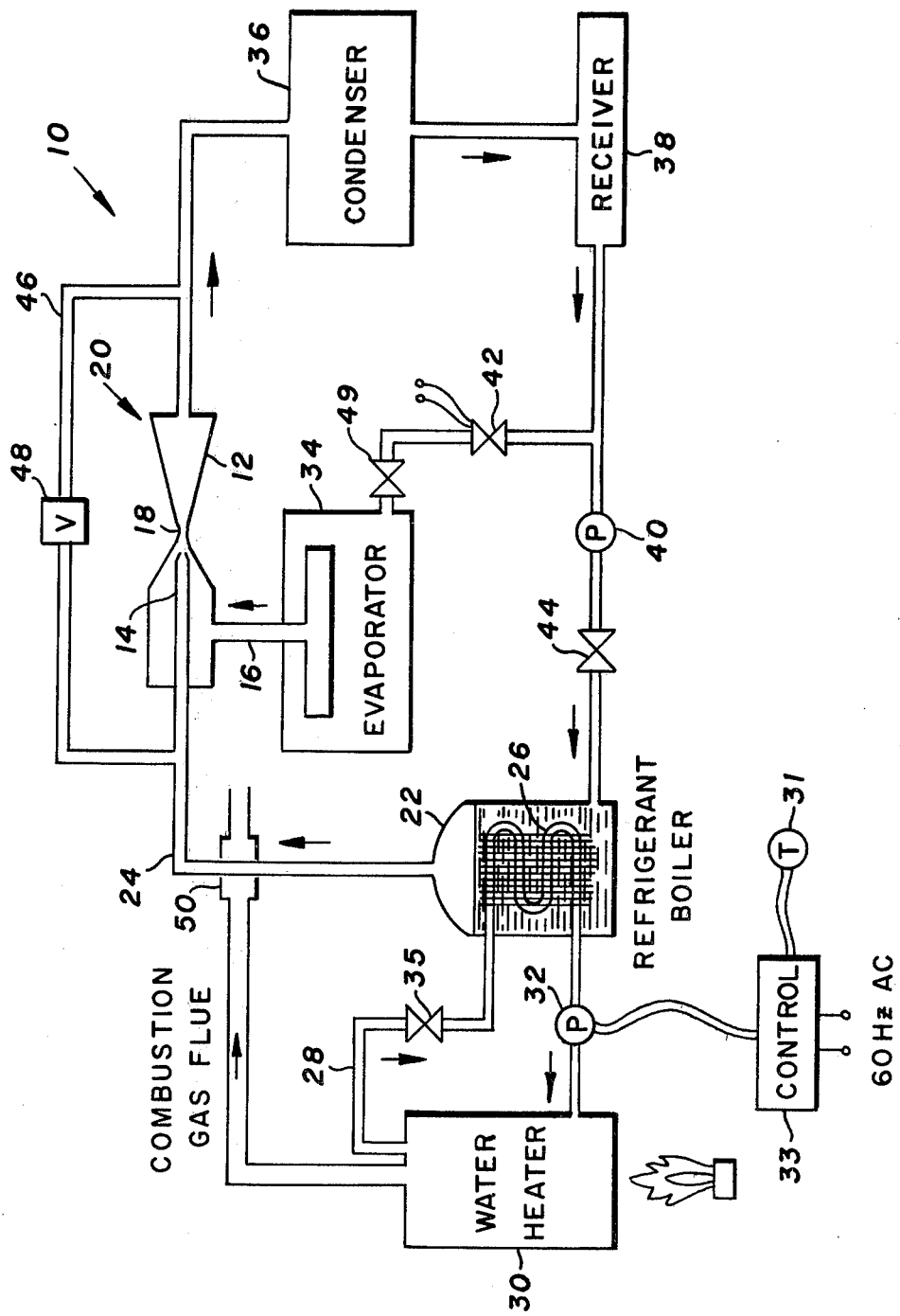

VAPOR-JET HEAT PUMP

BACKGROUND OF THE INVENTION

I. Field of the Invention

This invention relates generally to a heat pump apparatus and more specifically to the design of a fuel burning heat pump system which utilizes an ejector device as the compressor mechanism therein.

II. Discussion of the Prior Art

Many forms of heat pumps are known in the prior art for removing heat energy from one location and dissipating it in another location. As such, the same device may be used for either heating or cooling a particular enclosed volume, depending upon the direction of flow employed. In a typical, prior art, installation used for heating an enclosed volume, a refrigerant is made to flow from an evaporator disposed outside of the volume, through a compressor and to a condenser disposed within the volume to be heated. When operating in a cooling mode, however, the direction of refrigerant flow is reversed such that the heat exchanger formerly acting as the evaporator now becomes the condenser and the heat exchanger formerly acting as the condenser serves as the evaporator. In the majority of prior art heat pumps, the compressor comprises an electric motor driven pump which receives refrigerant vapors at a lower pressure and which delivers gaseous refrigerant at a substantially higher pressure to a heat exchanger where liquefaction of the refrigerant takes place.

It is also well known in the art that motor driven pump-type compressors may be replaced with a so-called jet compressor in which the liquid refrigerant is introduced into a boiler where it generates a vapor under high pressure which is delivered to the ejector. As this high pressure fluid passes through the nozzle, it creates a low pressure zone within the nozzle effective to draw gaseous refrigerant from an evaporator heat exchanger where it becomes mixed with the primary flow and transferring heat energy picked up at the evaporator unit to the condenser heat exchanger.

SUMMARY OF THE INVENTION

The present invention is considered to be an improvement over known prior art heat pump systems. It is an improvement over prior heat pumps depending solely or mainly on electricity for power because it is powered principally by combustible fuels which cost substantially less per unit of heat energy delivered. It is an improvement over prior ejector type heat pumps in the use of a refrigerant superheater which increases the ejector performance. It is also an improvement over prior heat pumps requiring supplemental electrical heat during extreme weather because it can bypass hot refrigerant to the point of delivery at the condenser, thereby meeting the severe weather requirements without supplementary heat. Specifically, the system of the present invention includes an indirectly heated boiler, the primary heat source being a fuel burning water heater. The heated (and vaporized) refrigerant from the indirect boiler is passed through a superheater receiving heat from the exiting combustion gases resulting from the combustion of fuel firing the water heater and then to the primary jet of an ejector compressor. The ejector, itself, comprises a venturi into which a primary nozzle admits a high velocity refrigerant vapor jet creating a partial vacuum for drawing vaporized refrigerant from the evaporator heat exchanger. Thus, the primary and secondary (evaporator) flow mix in the ejector and enter the condenser at a pressure intermediate their individual pressures. The output from the ejector couples to the condenser heat exchanger where the vapor is allowed to give up its heat energy to the ambient whereby liquefaction of the refrigerant material takes place. The liquid refrigerant exiting from the condenser flows into a storage device termed the "receiver" where it becomes available to flow through suitable control valves to replace the refrigerant that is leaving the evaporator. A boiler feed pump also draws liquid refrigerant from the receiver and forces it through a check valve into the refrigerant boiler on a re-circulating basis.

In accordance with the preferred embodiment to be described, the refrigerant boiler receives its heat input from the flow of hot water through an indirect heat exchanger, the water being circulated by a small electric pump from a fuel burning water heater. The pressure in the refrigerant boiler is maintained by cycling the water circulating pump on and off. A suitable flow check valve prevents gravity circulation of water when the pump is de-energized.

OBJECTS

Accordingly, it is the principal object of the present invention to provide a new and improved heat pump unit for residential, commercial or industrial applications.

Another object of the invention is to provide a heat pump utilizing the so-called jet pump compressor in which the performance of the jet pump is improved by the use of a refrigerant superheater.

Another object of the invention is to provide a heat pump which is energized by the burning of conventional fuels.

Still another object of the invention is to provide an improved heat pump having improved operating cost-effectiveness over known prior art designs.

These and other objects and advantages of the invention will become apparent to those skilled in the art from the following detailed description of the preferred embodiment considered in conjunction with the accompanying drawing.

DESCRIPTION OF THE FIGURE

The drawing indicates diagrammatically the structural components comprising the improved heat pump of the present invention.

DESCRIPTION OF THE PREFERRED EMBODIMENT

Referring to the drawing, indicated generally by numeral 10 is a schematic representation of the heat pump system of the present invention. Included in the system 10 is an ejector unit 12 having a primary input jet 14, a secondary input tube 16, a throat section 18 and a diffuser section 20. The primary input jet 14 is adapted to be connected to a source of vaporized refrigerant which may conveniently be developed within a refrigerant boiler as at 22. The gaseous refrigerant is made to pass by way of the piping 24 through a superheater 50 which is a heat exchanger receiving heat from the exiting combustion gases and then to the inlet jet. The superheater performs the important function of additional heat recovery from the exiting combustion gases while also adding energy to the refrigerant entering the primary jet. This increases the enthalpy of the refrigerant, improving the efficiency of the ejector and reducing the probability of liquid droplet formation in the primary jet which reduces performance.

In accordance with the present invention, the refrigerant boiler 22 is preferably of the indirectly heated type. That is to say, it includes a heat exchanger 26 in the form of many tubes through which the hot water is circulated and having a plurality of fins affixed thereto for providing an increased heat transfer surface. The heat exchanger 26 is arranged to receive hot water via tubing 28 from a water heater or boiler 30 which is preferably heated by burning any one of a number of possible fuels which may, for example, include heating oil, LPG coal, or natural gas. While convection currents may be sufficient to cause the flow of heated water from the water heater unit 30 through the heat exchanger 26 of the refrigerant boiler 22, it has been found expedient to include an electric motor driven pump as at 32 to ensure adequate flow rates. It is possible to control the temperature and pressure of the refrigerant in the boiler 22 by modulating the output from the pump 32 by a temperature responsive control circuit 33 or, more conventionally, by thermostatically controlling the temperature of the water in the heater unit 30. A check valve 35 is used to prevent gravity flow in the lines when the pump 32 is deenergized.

The high pressure vaporized refrigerant leaving the jet nozzle 14 creates a low pressure at the secondary inlet 16 to which an evaporator unit 34 is connected. The evaporator may be of conventional design and in that manner may comprise a heat exchanger in the form of thermally conductive tubing through which the liquid refrigerant is allowed to enter. A suitable blower or fan (not shown) may be associated with the evaporator for causing ambient air to pass over the heat exchange surface contained therein to thereby vaporize the refrigerant which, as can be seen, would be at a relatively low pressure and therefore would have a low boiling point.

The vaporized refrigerant entering the ejector 12 via the secondary inlet 16 mixes with the high pressure stream entering via the inlet jet 14 and passes through the ejector diffuser 20 to a condenser 36. Condenser 36 typically includes a heat exchanger in the form of a predetermined length of tubing which may be bent in serpentine fashion or may comprise a plurality of tubes extending in parallel between an input header and an output header. It is also common practice to include a plurality of conductive fins which are in contact with the heat exchanger tubing to provide additional surface from which heat energy may transfer. Further, the condenser unit 36 may involve the use of a motor driven fan (not shown) for aiding in the dissipation of the heat energy contained within the refrigerant flowing through it. In this fashion, the refrigerant is converted from a gaseous phase to a liquid phase, the liquid being passed into a reservoir or receiver 38. Thus, the liquefied refrigerant becomes available to maintain the refrigerant level within the evaporator 34 and the refrigerant boiler 32. A pump, as at 40, facilitates the transfer of the liquid refrigerant. A solenoid valve 42 may be used to control the flow of liquid refrigerant into the evaporator 34 and, in this regard, the valve 42 may be float controlled to maintain a desired level therein. A check valve 44 connected between the outlet of the pump 40 and the inlet of the refrigerant boiler 22 may be utilized to prevent flow back from the boiler when the pump is off. An expansion valve 49 reduces the pressure of the liquid to the level desired in the evaporator.

OPERATION

Now that the overall construction of the unit has been described, consideration will be given to its operation.

In the heating mode, the heat pump transfers useful heat from a relatively low temperature source such as outside air or ground or water by reducing the refrigerant pressure in the evaporator and making its temperature lower than that of the heat source. Under these conditions, then, heat energy is drawn into the refrigerant at the evaporator and is then pumped to a higher pressure level existing at the condenser 36 by operation of the ejector compressor unit 12. Specifically, high pressure refrigerant vapor is made to flow from the refrigerant boiler 22 through the superheater 50 to the primary nozzle or jet 14 into the converging-diverging throat 18. The high velocity vapor exiting from the primary nozzle 14 which is also a converging-diverging nozzle in proximity to the secondary inlet 16 creates a partial vacuum at that location tending to draw the vaporized refrigerant from the evaporator unit 34 where it mixes with the vaporized refrigerant exiting the jet 14 and enters the condenser 36 at a pressure part way between their individual pressures. In flowing through the condenser unit 36, the refrigerant vapors are cooled and the heat given off is used to warm the volume in which the condenser unit is disposed. Ultimately, the refrigerant is converted back to its liquid phase and is fed into the reservoir 38 where it again becomes available to flow through the pump 40 and the valves 42 and/or 44 to replace the refrigerant that is leaving the evaporator 34 or the refrigerant boiler 22.

Thus, as the system is illustrated in the drawing, the refrigerant boiler 22 receives its heat input from the flow of hot water through an indirect heat exchanger 26, the water being circulated by an electric pump 32. The pressure in the refrigerant boiler 22 is maintained by the controller 33 cycling the water circulating pump 32 on and off.

The fuel burning water heater 30 may burn any one of a number of fuels, including, but not limited to, natural gas, manufactured gas, liquefied petroleum gas, coal, fuel oil, etc. The fuel burner 30 is controlled to maintain the required water temperature by an immersion thermostat (not shown) contained therein. The water circulating pump 32 may be controlled by a space thermostat as at 31. For safety purposes, it may also be desired to include a pressure sensor in the refrigerant boiler 22 for controlling the temperature of the water in the unit 30.

Any one of a number of common refrigerants may be utilized in the system of the present invention. Commercially available fluorocarbon refrigerants such as R-11, R-114 and R-113 are all useful, R-11, however, appearing to be the most compatible with practical requirements of the system, such as heat exchanger pressure ratings, pipe diameters and pressure ratios.

While the system of the present invention is illustrated as utilizing a water heating unit as the source of heat for the refrigerant boiler, it is also possible to make the present invention operate effectively with a single high pressure fuel burning boiler wherein the refrigerant boiler 22 would be directly heated by the burning fuel. The use of an indirect heating approach such as is illustrated in the drawings and described herein is preferred in that it obviates the need for special purpose components, especially high pressure fuel-fired heat exchangers and, in addition, provides a convenient means of controlling the vapor pressure in the refrigerant boiler.

It is to be further noted that a bypass branch 46 is coupled between the output from the boiler 22 to the output of the ejector 12. When the valve 48 is open, additional vaporized refrigerant can be made to flow for satisfying extremely high heating demand conditions, thereby eliminating the need for supplementary heat in the building in which the present invention may be utilized as the heating system.

It can be seen, then, that the system of the present invention affords the advantage that the heat available from the burning of the fuel is delivered directly to the point of application in the condenser. In addition, the heat taken from the lower temperature source, i.e., at the evaporator, is also delivered directly to the desired point of application at the condenser. The "free" heat obtained from the atmosphere or other heat source with which the evaporator unit cooperates can substantially reduce the fuel consumption of the overall system, especially when compared to a conventional fuel burning furnace. A savings of 30% to 50% or more in fuel costs appear to be feasible.

The foregoing detailed description has been given for clearness of understanding only, and no unnecessary limitations should be understood therefrom as modifications will be obvious to those skilled in the art.

What is claimed is:

1. A heat pump system comprising in combination:
   (a) a first heat exchanger disposed in an enclosed zone to be heated;
   (b) a second heat exchanger disposed in a heat transfer relationship to the ambient outside of said enclosed zone;
   (c) fuel fired boiler means for producing vaporized refrigerant at a relatively high pressure;
   (d) a refrigerant superheater for receiving hot combustion gases from the burning of said fuel and coupled in a heat exchange relationship with said vaporized refrigerant to thereby superheat the vaporized refrigerant leaving said boiler;
   (e) an ejector pump having a primary jet nozzle coupled to said refrigerant superheater, a secondary inlet adapted to be coupled to said second heat exchanger and an outlet, the flow of high pressure refrigerant vapor through said primary jet creating a negative pressure proximate said secondary inlet;
   (f) means coupling said outlet of said ejector pump to said first heat exchanger for condensing the high pressure vaporized refrigerant to a liquid phase;
   (g) reservoir means for collecting the liquefied refrigerant produced by said first heat exchanger; and
   (h) means coupling said reservoir means to said first heat exchanger means and to said boiler means for maintaining a predetermined level of liquid refrigerant in each.

2. Apparatus as in claim 1 wherein said boiler means comprises:
   (a) a vessel having a liquid refrigerant inlet port and a vaporized refrigerant outlet port;
   (b) heat exchanger means disposed in said vessel and in heat transfer relationship to the liquid refrigerant contained in said vessel;
   (c) a fuel fired water heater having a hot water line connected to said heat exchanger means in said vessel and a return line coupling said heat exchanger back to said water heater;
   (d) an electrical pump disposed in either said hot water line or said return line for causing circulation of heated water through said heat exchanger disposed in said vessel; and
   (e) control means operatively coupled to said electric pump for varying the flow of hot water through said heat exchanger disposed in said vessel as a function of a monitored parameter.

3. Apparatus as in claim 1 and further including:
   (a) bypass means including a bypass valve connected in shunt relationship with said ejector pump.

4. Apparatus as in claim 2 wherein said monitored parameter is the temperature within said enclosed zone.

5. Apparatus as in claim 2 and further including:
   (a) combustion gas flue means on said fuel fired water heater, said flue means being coupled to said refrigerant superheater.

* * * * *